US010743167B1

(12) United States Patent
Katz et al.

(10) Patent No.: US 10,743,167 B1
(45) Date of Patent: Aug. 11, 2020

(54) POINT-OF-SALE TERMINAL WITH INTEGRATED EMERGENCY SERVICES REQUEST CAPABILITY

(71) Applicant: National Retail Solutions, Inc., Newark, NJ (US)

(72) Inventors: Elie Y. Katz, Teaneck, NJ (US); Harold Jeffrey Goldberg, Lakewood, NJ (US)

(73) Assignee: National Retail Solutions, Inc., Newark, NJ (US)

( * ) Notice: Subject to any disclaimer, the term of this patent is extended or adjusted under 35 U.S.C. 154(b) by 0 days.

(21) Appl. No.: 16/190,566

(22) Filed: Nov. 14, 2018

(51) Int. Cl.
  *G06Q 20/20* (2012.01)
  *H04W 4/90* (2018.01)
  *H04W 4/14* (2009.01)
  *G06Q 50/26* (2012.01)

(52) U.S. Cl.
  CPC ............ *H04W 4/90* (2018.02); *G06Q 20/202* (2013.01); *G06Q 50/26* (2013.01); *H04W 4/14* (2013.01)

(58) Field of Classification Search
  CPC ........ H04W 4/90; H04W 4/14; G06Q 20/202; G06Q 50/26
  See application file for complete search history.

(56) References Cited

U.S. PATENT DOCUMENTS

| 10,198,924 B1* | 2/2019 | Pham | G08B 15/001 |
| 2005/0009536 A1* | 1/2005 | Ito | G06Q 30/02 |
| | | | 455/456.1 |
| 2010/0008478 A1* | 1/2010 | Arao | H04M 1/2535 |
| | | | 379/37 |
| 2013/0144731 A1 | 6/2013 | Baldwin | |
| 2013/0154807 A1* | 6/2013 | Beach | H04Q 9/00 |
| | | | 340/10.4 |
| 2015/0147997 A1* | 5/2015 | Shaw | H04W 4/90 |
| | | | 455/404.2 |
| 2015/0348001 A1* | 12/2015 | Van Os | G06Q 20/40 |
| | | | 705/44 |
| 2016/0005020 A1 | 1/2016 | Fernando | |
| 2018/0253805 A1 | 9/2018 | Kelly | |
| 2018/0285852 A1 | 10/2018 | Matsui | |
| 2019/0251541 A1 | 8/2019 | Etzion | |

\* cited by examiner

*Primary Examiner* — Joseph E Dean, Jr.
(74) *Attorney, Agent, or Firm* — Oblon, McClelland, Maier & Neustadt, L.L.P.

(57) ABSTRACT

A point-of-sale terminal is used to process purchases by a customer during normal operation. However, during an emergency, the cashier activates an "emergency button" to indicate that the cashier needs police assistance. Once the cashier has indicated that an emergency condition occurs, the point-of-sale terminal attempts to utilize at least one communications adapter to notify the police of the emergency condition, either directly or via a monitoring service if the store subscribes to a monitoring service.

24 Claims, 2 Drawing Sheets

POINT-OF-SALE TERMINAL WITH INTEGRATED EMERGENCY SERVICES REQUEST CAPABILITY

FIELD OF INVENTION

The present invention is directed to a point-of-sale terminal with integrated emergency services request capabilities, and, in one embodiment, to a touchscreen-based point-of-sale terminal that can communicate with police in the event of a robbery or other emergency.

DISCUSSION OF THE BACKGROUND

Almost every day, in multiple locations nationwide, burglaries and assaults are happening in small, independent convenience stores. Bodegas, groceries and liquor stores conduct a lot of business in cash, and this makes these stores strong target for holdups. Owners and clerks fear for their safety and that of their customers. Increasingly store owners are opting to be open extended hours at night, some even 24 hours, allowing them to serve customers around the clock and to increase their revenue. However, when outside and inside foot traffic is slower, there is increased risk for burglary and assault.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
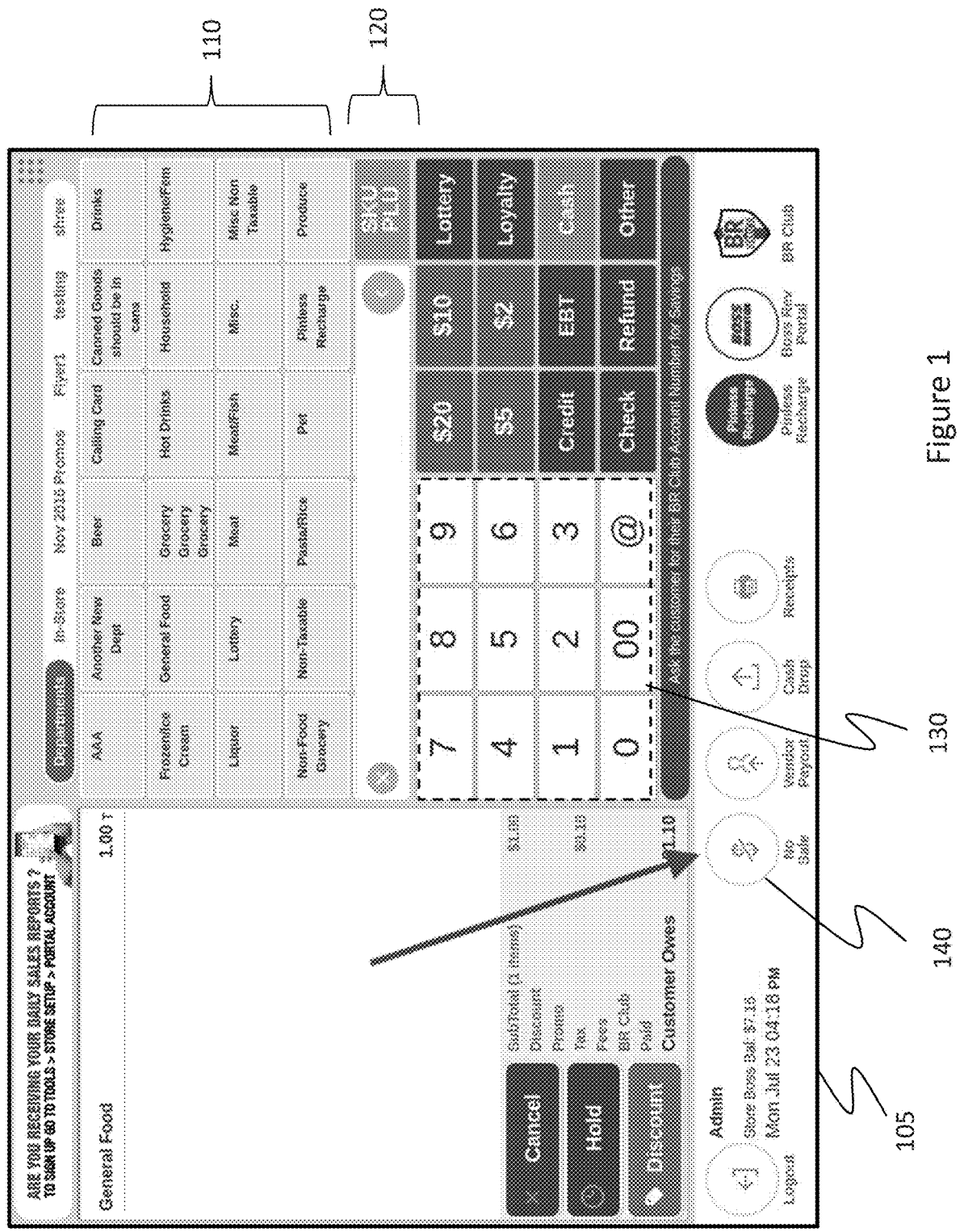
FIG. 1 is a mock-up of a touchscreen of a point-of-sale terminal as would be used in a convenience store.
Figure 2:
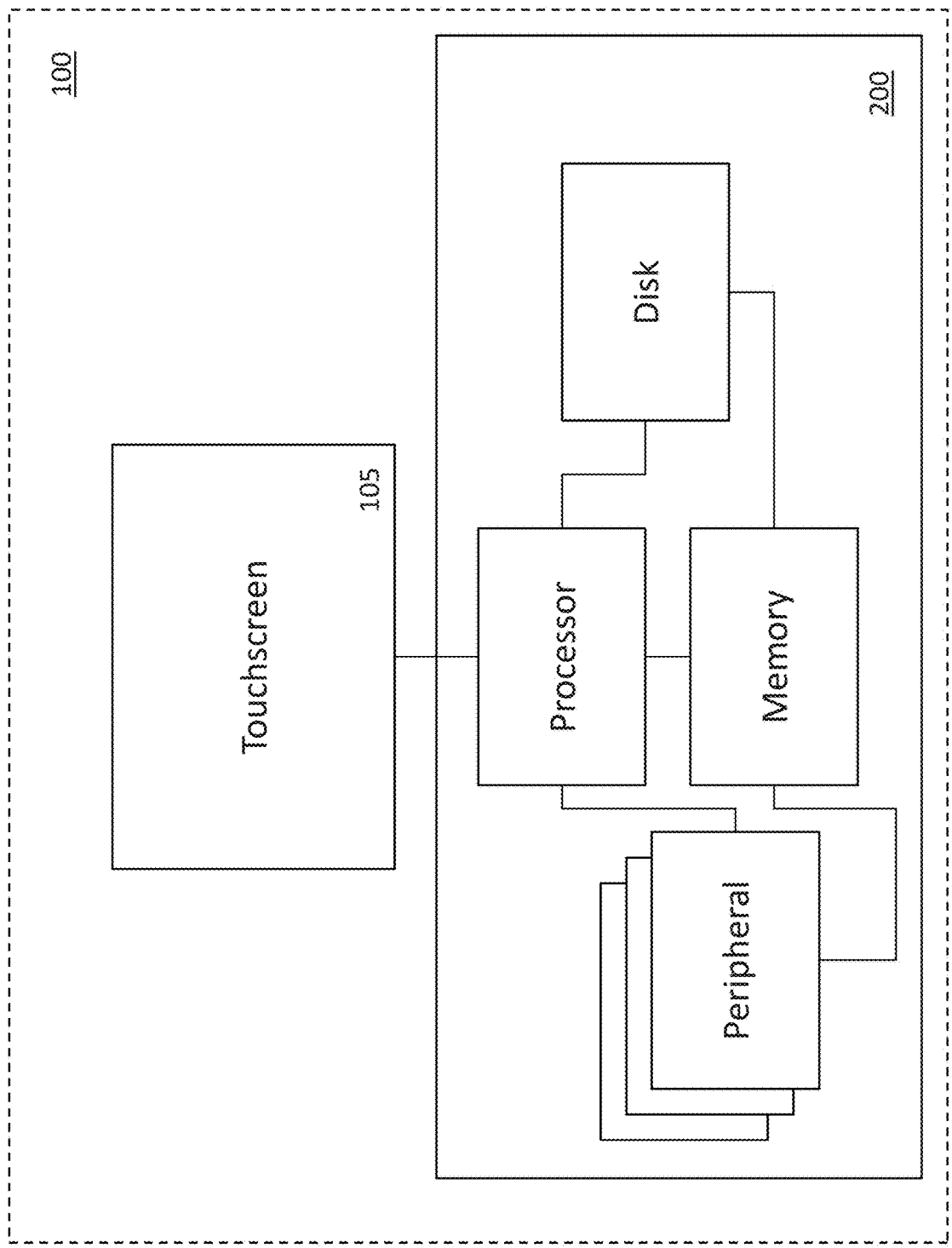
FIG. 2 is a block diagram of an exemplary point-of-sale terminal.

Turning to FIG. 1, a touchscreen 105 of a point-of-sale (POS) terminal 100 (FIG. 2) as would be used in a convenience store is illustrated. The touchscreen 105 is connected to (e.g., by a wired or a wireless connection) or integrated with a computer 200 (FIG. 2) that generates the image displayed on the touchscreen 105 (using a processor under the control of computer instructions stored in a non-transitory computer memory (e.g., DRAM, SRAM, FRAM, FlashROM, ROM)). In addition, the computer is connected to (e.g., by a wired or a wireless connection) or integrated with a cash drawer that opens in response to commands entered on the touchscreen 105. The computer 200 (FIG. 2) typically includes a computer processor, computer memory and a number of peripherals (e.g., at least one disk drive, at least one USB connector, a Bluetooth transceiver, a barcode reader, a scale, a printer, a safe, and at least one communications adapter for connecting to processing systems for one or more of credit cards, debit cards, and prepaid telephone cards). The at least one disk drive stores computer code (e.g., operating system code (such as Windows or Linux) and application code) to be loaded into the computer memory to cause the processor to implement functions expressed by the code. One of the main functions of the application code loaded into the computer memory is for generating a user interface on the touchscreen display and for responding to commands entered. Such application code may be in the form of executable or interpretable code (e.g., Python) as long as it can generate a display and respond to touchscreen commands. In one embodiment, the application code loaded into the computer memory that generates the user interface on the touchscreen display is configurable (e.g., by reading configuration files at start-up) so that the content and layout of the touchscreen can be configured to the environment that it is going to be used in. For example, the "Liquor" button may be configurably replaced by another button if the store does not sell liquor.

In normal operation, the point-of-sale terminal is used to process purchases by a customer. A cashier may utilize a barcode scanner connected to the point-of-sale terminal to speed entry of the items being purchased. The cashier also may utilize "category" buttons 110 to facilitate purchase of items that do not have a barcode (or when the barcode is missing or unreadable). The touchscreen 105 further may include a SKU/PLU area 120 for manually entering a SKU/PLU for an item being processed (e.g., purchased or returned). By activating the SKU/PLU area 120, the cashier can then use the numeric keypad area 130 to enter the SKU/PLU for the current item. (Alternatively, the point-of-sale terminal may include an external keypad or keyboard that can be used instead of the numeric keypad area 130 for all user interactions described herein without departing from the teachings of the present application.)

In an emergency operation, the cashier activates an "emergency button" 140 that is preferably labeled something inconspicuous (e.g., "No sale"). In fact, the emergency button 140 can act as a normal button during non-emergency situations. For example, when the cashier does want to utilize the emergency button 140 as an actual "no sale" button, the cashier just presses the emergency button 140 followed by a non-emergency code (e.g., "123") entered using the numeric keypad area 130. Alternatively, when the cashier wants to indicate an emergency situation, the cashier presses the emergency button 140 followed by an emergency code (e.g., "911", "119", or by some emergency prefix (such as "") followed by the non-emergency code) entered using the numeric keypad area 130. In another embodiment, the emergency button 140 is activated and held for at least a period of time that is longer than a normal activation of the button (e.g., 2 seconds rather than a normal 0.5 second push). In another embodiment, the emergency button 140** is activated a number of times in quick succession (e.g., 4 times in under 2.5 seconds) to indicate an emergency.

Additional mechanisms can be used to indicate an emergency situation instead of using the emergency button plus a code. For example, the cashier can scan a special bar code or reserved item using the barcode scanner of the point-of-sale terminal. Similarly, the cashier can enter a special key sequence (e.g., a quantity of 911, or 911 SKU) on the touchscreen or on an associated keypad.

The cashier additionally may indicate that help is needed by activating a special call-for-help button (e.g., under the counter) connected to the POS via USB, serial port or wireless technology, including a cell phone, smart watch, or even a health monitoring device.

The cashier additionally may indicate that help is needed by making a predefined gesture or set of gestures on the POS touchscreen or on an associated touch device. For example, by drawing a "9" or an "H" on the touchscreen 105, the point-of-sale terminal detects that an emergency condition is occurring. In another embodiment, the emergency gesture may be dragging one's finger across multiple buttons on the touchscreen 105 in quick succession. The gesture may be either a single finger gesture or a multi-finger gesture.

Alternative gestures include "mid-air" gestures that are detected by a vision processing input device such as a Kinect adapter.

Each of the above techniques for indicating that an emergency condition exists can be monitored using programming callback functions inside the application providing the point-of-sale graphical user interface, and the programming callback functions specify what action is to be taken when a graphical user interface control (e.g., button or icon) is interacted with by a user (e.g., touched, held, released, dragged, or swiped). The action to be taken may be in the form of a programming routine that is run using parameters (or variable values) specified at at least one of: when the call back is registered and when the interaction with the control occurs. For example, the application may register a callback functions that are triggered when the "No sale" button is clicked that interact with callback functions that are triggered when the numeric buttons/icons are depressed such that the application can determine if the non-emergency PIN, the emergency PIN or an incorrect PIN are entered. Alternatively, the callback functions may be replaced by "polling" which continually checks for interactions with the touchscreen and which calls programmed functions instead to track where in the testing for an emergency situation the application is (e.g., using a state machine to track what icons have been interacted with and in what order).

Once the cashier has indicated that an emergency condition occurs, the cash drawer opens, but the point-of-sale terminal attempts to utilize at least one communications adapter to notify the police of the emergency condition. For example, in the case of a monitored store, the point-of-sale terminal sends at least one IP-based message to the monitoring service responsible for monitoring the store. In one embodiment, the IP-based message is transmitted using a connection-oriented communication protocol (e.g., TCP/IP), and the IP-based message includes store-identifying information (e.g., at least one of a store identifier, a caller ID, or an Account ID) which is used to lookup store information that will enable the monitoring service to dispatch police. In one embodiment, the IP-based message is a POST message using the HTTP or HTTPS protocols where the application, as part of the POST message processing, creates a TCP/IP-based socket connection to the remote server, and posts (or sends) the corresponding data relating to the emergency situation to a specified URL. The data relating to the emergency situation may be read from a configuration file, generated dynamically (e.g., by reading a real-time clock), or a combination of both. The information transfer using the POST message may be repeated a number of times (and across multiple interfaces) in the presence of communications failures. The system may include a configuration file that specifies what server to connect to and what the order of communications interfaces to use is. The data in the POST message may be encoded using an untagged format (e.g., plain text) or using a tagged format (e.g., HTML, XML, or JSON).

The IP-based message also may include cashier-centric information (i.e., information about the cashier on site, such as a name and a description of the cashier). Alternatively, the IP-based message may be a voice-recording with store-identifying information and optionally cashier-centric information. The monitoring service likewise can receive the information via a text or SMS message. The IP-based communication can be over any wired or wireless communications interface, such as, but not limited to, WiFi, cellular, Zigbee, LORAN, and mesh networks. Additionally, the point-of-sale terminal can communicate with a third-party (directly or using a dialer) using other radio wave-based communications (e.g., in the cordless phone spectrum, or in unregulated RF spectrums), or generally using sound waves (including but not limited to ultrasonic waves) and light waves (including but not limited to infrared waves).

In an alternative embodiment, rather than using an IP-based message, the point-of-sale terminal may dial an alarm monitoring company using an attached dialer unit (via USB, serial port or other wireless technology). The point-of-sale terminal will cause the account or other information identifying the store to be transmitted to the alarm monitoring company (e.g., using caller ID information or embedded in the message). In one embodiment, the point-of-sale terminal controls a previously paired on-premises cell phone to act as the dialer using a Bluetooth connection between the point-of-sale terminal and the cell phone. Based on what device is paired with the point-of-sale terminal, the system may (e.g., using a database of employees logged on when the pairing occurred) send employee information to police or a monitoring service so that the police can be informed of relevant information about the employee(s) they are likely to encounter (e.g., what the employee looks like and what language skills the employee has).

In yet another embodiment, if the store does not subscribe to a monitoring service, an IP message may instead be transferred to internet-based dialing service such that a pre-recorded voice message containing store information can be played (e.g., on loop) for one or more recipients of the call(s) from the terminal once the call(s) is/are answered. In one embodiment, the recipient of the call is a store manager or owner, but in another embodiment the recipient of the call is a police dispatcher (e.g., called using "911" or a direct dial number of a local precinct). The POS terminal likewise can be configured to make multiple calls thereby alerting both the store owner/manager and the police dispatcher. Alternatively, or in addition, the point-of-sale terminal can cause caller ID information to be embedded in the message to identify the store. The store owner/manager and the police dispatcher likewise can receive the information via a text or SMS message.

In an alternative embodiment, rather than using an IP-based message, the point-of-sale terminal may dial the store owner/manager or police dispatcher directly using an attached dialer unit (via USB, serial port or other wireless technology). The point-of-sale terminal will cause the account or other information and/or a voice message identifying the store to be transmitted to the call recipient. In one such embodiment, the point-of-sale terminal controls a previously paired on-premises cell phone to act as the dialer using a Bluetooth connection between the point-of-sale terminal and the cell phone.

In at least one configuration, the system is configured to contact a communications repeater which is configured to contact multiple recipients on behalf of the system. For example, the system could remotely connect to a server (e.g., using IP-based communication over a wired or wireless connection), send emergency situation information to the connected server, and then the server could handle the contacting of additional third parties (e.g., the store manager, the alarm company and emergency services (such as the police)) in an order specified on the server. Thus, the order of calls could be changed without needing access to the point of sale system.

In configurations where the point-of-sale terminal is connected (by a wired- or a wireless-connection) to video equipment, the point-of-sale terminal may send a command to the video equipment to "start recording" or "mark the recording" for later retrieval. "Marking" the recording for later retrieval may include commanding the system to note the date and/or time of the indicated emergency situation. In addition, the point-of-sale terminal may be configured to send a command to the video equipment video to switch to persistent recording (instead of running on a loop) and to store the video until the disable code is used.

While certain configurations of structures have been illustrated for the purposes of presenting the basic structures of the present invention, one of ordinary skill in the art will appreciate that other variations are possible which would still fall within the scope of the appended claims.

The invention claimed is:

1. A point-of-sale terminal comprising:
   a touchscreen;
   a computer processor; and
   a non-transitory computer memory, wherein the non-transitory computer memory stores computer instructions for controlling the computer processor to perform the steps of:
   receiving an indication of an emergency situation by (1) receiving an indication that a "no sale" button was pressed, and receiving an indication that an emergency code was entered after having received an indication that the "no sale" button was pressed;
   establishing at least one communication with at least one third-party; and
   sending to the at least one third party a notification of the emergency situation.

2. The point-of-sale terminal as claimed in claim 1, wherein sending to the at least one third party a notification of the emergency situation comprises sending a voice message.

3. The point-of-sale terminal as claimed in claim 1, wherein sending to the at least one third party a notification of the emergency situation comprises sending a repeating voice message.

4. The point-of-sale terminal as claimed in claim 1, wherein sending to the at least one third party a notification of the emergency situation comprises sending a text message.

5. The point-of-sale terminal as claimed in claim 1, wherein the non-transitory computer memory further stores computer instructions for controlling the computer processor to perform the steps of signaling to a video recording system to store a date/time of the emergency situation.

6. The point-of-sale terminal as claimed in claim 1, wherein the non-transitory computer memory further stores computer instructions for controlling the computer processor to perform the steps of signaling to a video recording system to begin recording.

7. The point-of-sale terminal as claimed in claim 1, wherein the non-transitory computer memory further stores computer instructions for controlling the computer processor to perform the steps of signaling to a video recording system to begin recording if not already recording.

8. The point-of-sale terminal as claimed in claim 1, wherein the at least one third-party is a monitoring service and a police dispatcher.

9. The point-of-sale terminal as claimed in claim 1, wherein the at least one third-party is a communications repeater for contacting plural additional third-parties.

10. The point-of-sale terminal as claimed in claim 1, wherein the at least one third-party is a monitoring service.

11. The point-of-sale terminal as claimed in claim 1, wherein the at least one third-party is a police dispatcher.

12. The point-of-sale terminal as claimed in claim 1, further comprising a serial interface, wherein the receiving from the user local to the point-of-sale terminal the indication of the emergency situation comprises receiving the indication of the emergency situation from a call-for-help button connected to the serial interface.

13. The point-of-sale terminal as claimed in claim 1, further comprising a wireless interface, wherein the receiving from the user local to the point-of-sale terminal the indication of the emergency situation comprises receiving the indication of the emergency situation from a call-for-help button via the wireless interface.

14. The point-of-sale terminal as claimed in claim 1, further comprising a vision processing input device, wherein the receiving from the user local to the point-of-sale terminal the indication of the emergency situation comprises receiving the indication of the emergency situation based on a gesture detected by the vision processing input device.

15. The point-of-sale terminal as claimed in claim 10, wherein establishing, from the point-of-sale terminal to the at least one third party, the at least one communication with the monitoring service comprises establishing an IP-based communication connection between the point-of-sale terminal and the monitoring service.

16. The point-of-sale terminal as claimed in claim 10, wherein establishing, from the point-of-sale terminal to the at least one third party, the at least one communication with the monitoring service comprises establishing a telephone connection between the point-of-sale terminal and the monitoring service.

17. The point-of-sale terminal as claimed in claim 10, wherein establishing, from the point-of-sale terminal to the at least one third party, the at least one communication with the monitoring service comprises establishing a telephone connection with the monitoring service using a cellular telephone.

18. The point-of-sale terminal as claimed in claim 10, wherein establishing, from the point-of-sale terminal to the at least one third party, the at least one communication with the monitoring service comprises:
   establishing a Bluetooth connection between a cellular telephone and the point-of-sale terminal; and
   establishing a cellular telephone connection with the monitoring service using the cellular telephone.

19. The point-of-sale terminal as claimed in claim 10, wherein establishing, from the point-of-sale terminal to the at least one third party, the at least one communication with at least one third-party comprises establishing an IP-based communication connection using a cellular interface of the point-of-sale terminal.

20. The point-of-sale terminal as claimed in claim 10, wherein establishing, from the point-of-sale terminal to the at least one third party, the at least one communication with at least one third-party comprises establishing an IP-based communication connection using a WiFi interface of the point-of-sale terminal.

21. The point-of-sale terminal as claimed in claim 10, wherein establishing, from the point-of-sale terminal to the at least one third party, the at least one communication with at least one third-party comprises establishing an IP-based communication connection using a Bluetooth interface of the point-of-sale terminal.

22. A point-of-sale terminal comprising:
   a touchscreen;
   a computer processor; and a non-transitory computer memory, wherein the non-transitory computer memory stores computer instructions for controlling the computer processor to perform the steps of:
   receiving from a user local to the point-of-sale terminal an indication that help is needed by the local user;
   establishing, from the point-of-sale terminal to at least one third party, at least one communication in response to receiving the indication that help is needed by the local user; and
   sending from the point-of-sale terminal to the at least one third party a notification that help is needed by the local user,
wherein the receiving from the user local to the point-of-sale terminal the indication that help is needed by the local user comprises pushing and holding, by the local user, a button displayed on the touchscreen for at least a period of time that is longer than a normal activation of the button.

23. A point-of-sale terminal comprising:
a touchscreen;
a computer processor; and
a non-transitory computer memory, wherein the non-transitory computer memory stores computer instructions for controlling the computer processor to perform the steps of:
   receiving from a user local to the point-of-sale terminal an indication of an emergency situation;
   establishing, from the point-of-sale terminal to at least one third party, at least one communication in response to receiving the indication of the emergency situation; and
   sending from the point-of-sale terminal to the at least one third party a notification of the emergency situation,
wherein the receiving from the user local to the point-of-sale terminal the indication of the emergency situation comprises pushing a button displayed on the touchscreen a number of times in quick succession.

24. A point-of-sale terminal comprising:
a touchscreen;
a bar code scanner;
a computer processor; and
a non-transitory computer memory, wherein the non-transitory computer memory stores computer instructions for controlling the computer processor to perform the steps of:
   receiving from a user local to the point-of-sale terminal an indication of an emergency situation;
   establishing, from the point-of-sale terminal to at least one third party, at least one communication in response to receiving the indication of the emergency situation; and
   sending from the point-of-sale terminal to the at least one third party a notification of the emergency situation,
wherein the receiving from the user local to the point-of-sale terminal the indication of the emergency situation comprises scanning using the bar code scanner to scan a bar code indicating the emergency situation.

\* \* \* \* \*